United States Patent Office 3,557,062
Patented Jan. 19, 1971

3,557,062
POLAR POLYMERS DERIVED FROM
BICYCLO[2.2.1]HEPTENE-2
Jean Vergne, Leon Solaux, Jean-Claude Robinet, and Philippe Lacroix, Verneuil-en-Halatte, France, assignors to Charbonnages de France, Paris, France, a public institution of France
No Drawing. Filed July 22, 1968, Ser. No. 746,277
Claims priority, application France, July 25, 1967, 115,634; May 28, 1968, 153,175
Int. Cl. C08f 5/00, 17/00
U.S. Cl. 260—78.4
16 Claims

ABSTRACT OF THE DISCLOSURE

New polymers obtained from esters derived from bicyclo [2.2.1]heptene-2 carboxylic-5 and dicarboxylic-5,6 acids having a glass transition temperature lower than −10° C. for use in the field of elastomers.

---

The present invention relates to new polymers obtained from esters derived from bicyclo [2.2.1] heptene-2. It is more particularly concerned with the polymers of the esters of bicyclo [2.2.1] heptene-2 carboxylic-5 acid and bicyclo [2.2.1] heptene-2 dicarboxylic-5,6 acid. It is preferably concerned with polymers of the above-mentioned esters having a glass transition temperature lower than −10° C., and obtained by opening the ring containing the double bond.

As intermediate products, the esters of the bicyclo [2.2.1] heptene-2 carboxylic-5 acid and bicyclo [2.2.1] heptene-2 dicarboxylic-5,6 acid comply respectively with Formulae I and II below:

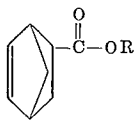  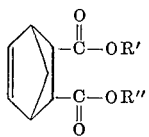

(I)  (II)

in which, according to the invention, R represents an alkyl radical which can be substituted if so desired and which can be straight or branched preferably comprising 2 to 14 atoms of carbon in main chain, with the proviso that branching is not located on the carbon atom bonded to the carboxyl group and R' and R'' have the same meaning as R and may be identical with or different from each other.

The polymers according to the invention comprise units which comply with the Formulae III and IV below, corresponding respectively to the compounds of Formulae I and II:

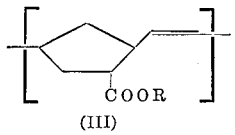  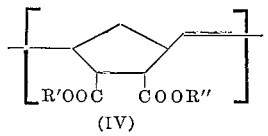

(III)  (IV)

in which R, R' and R'' have the meaning given above.

Amorphous polymers of bicyclo [2.2.1] heptene-2 carboxylic-5 acid and its methyl ester, obtained by opening the ring containing the double bond of the corresponding monomer, are already known. These polymers are solids having relatively high glass transition temperatures, and their utilization in the field of elastomers can hardly be contemplated.

The applicants have found that when esters of bicyclo [2.2.1] heptene-2 carboxylic-5 acid, derived from alkanols containing at least two carbon atoms, are subjected to polymerization, polymers are obtained having glass transition temperatures notably lower than those of the previous polymers. The glass transition temperature of the polymer obtained decreases generally with the increase of the number of carbon atoms of the alkanol employed. Thus, in the case of esters of normal primary alcohols, there are obtained, starting from n-butyl alcohol, polymers which can be utilized as such in the field of elastomers, whereas the ethyl and propyl esters can only serve as a base for elastomer compositions.

In the case of normal primary alkanols however, when the number of atoms of the alkyl radical derived from the alkanol is high, there are obtained polymers having melting temperatures which mask the glass transition temperatures. Thus, the esters of normal alkanols containing more than 14 atoms in the chain will be less advantageous for use in the field of elastomers.

The straight-chain alkanols can be replaced by alkanols which are branched. However, when the branching is located close to the carboxyl functions of the ester, on the carbon bonded to said function for example, the glass transition temperature is notably higher than that of the polymer of the ester containing the corresponding linear alkyl radical. The polymers of these esters are less advantageous for use in the field of elastomers. It is also possible to replace the alkanols by poly-functional substances containing an alcohol function, the mono-ethers of glycols, for example. The polymers thus obtained generally have a relatively low glass transition temperature and can be employed in the field of elastomers.

The invention also relates to the polymers of the esters of bicyclo [2.2.1] heptene-2 dicarboxylic-5,6 acid. The applicants have found that this acid and the esters derived from this acid cannot be polymerized when the acid or the esters obtained from the product of the dienic synthesis of maleic anhydride with cyclopentadiene are utilized directly. These substances have in fact a so-called "endo" -cis steric configuration and cannot be polymerized in the presence of ruthenium chloride and a reducing agent.

The applicants have discovered however that if the substances thus obtained are treated by heat, the derivatives of "exo" -cis configuration resulting from the thermal treatment can be polymerized by initiating with the aid of halides of noble metals, for example by means of ruthenium chloride in the presence of a reducing agent such as an alcohol. The polymers obtained from esters of this diacid have relatively low glass transition temperatures and, in the series of esters derived from the normal alkanols for example, they can be applied directly in the field of elastomers are regards the esters containing between 4 and 11 carbon atoms in the alkyl radical. In this case also, it is possible to employ with advantage either esters containing branched alkyl radicals, provided that the branching is not in the vicinity of the carboxyl function or esters of substituted alkanols, such as the mono-ethers of glycols.

The applicants have found however that it is also possible to effect the polymerization of the above diesters having the trans form.

The invention further relates to the co-polymers of these esters between each other and with other polymerizable compounds under the same conditions, in particular with bicyclo [2.2.1] heptene-2 and with methyl-5 bicyclo [2.2.1] heptene-2. The co-polymers according to the invention can be treated in the usual manner in the elastomer industry, in particular by vulcanization.

The monoesters serving as raw material for the polymers of the present invention can be obtained by condensation of cyclo-pentadiene with an alkyl acrylate or by esterification of bicycle[2.2.1]heptene-2 carboxylic-5 acid or its chloride. The diesters can be prepared by esterification of the condensation product of maleic anhydride with cyclopentadiene (nadic anhydride) after thermal transposition of this anhydride and separation of the exo form.

For the production of the trans-diesters according to the present invention, fumaric acid is condensed on cyclopentadiene and the product obtained is esterified, or alternatively a fumaric diester is condensed on the cyclopentadiene.

The following examples, given by way of illustration and not in any limitative sense will enable the scope and advantage of the invention to be better understood.

Examples 1 to 14 are concerned with the homopolymers of monoesters, Examples 15 to 39 the homopolymers of exo-cis diesters, Examples 40 to 42 the monoester/exo-cis diester copolymers, Examples 43 to 47 the copolymers of two exo-cis diesters, Examples 48 to 50 the copolymers exo-cis diester/bicyclo[2.2.1]heptene 2, Examples 51 to 54 copolymers exo-cis diester/methyl-5 bicyclo[2.2.1] heptene-2, Examples 55 and 56 the copolymers monoester/methyl-5 bicyclo[2.2.1]heptene-2 and bicyclo[2.2.1] heptene-2 respectively, and Examples 57 to 68 the polymers obtained with the trans-diesters.

In all these examples, there are always applied alcohols in which the alkyl radical is identical with that of the ester treated, that is to say the same alcohol as that employed for the preparation of the said ester.

EXAMPLE 1

There is introduced into an ampoule, 0.05 mol of ethyl ester of bicyclo[2.2.1]heptene-2 carboxylic-5 acid with 10 ml. of toluene, 33 mg. of hydrated ruthenium chloride and 2.5 ml. of the alcohol which was used to prepare the ester. After having been degasified under vacuum by successive melting and freezing of the reactants and then sealed, this flask is placed in a thermo-controlled bath at 90° C. for 24 hours. After polymerization, the ampoule is broken and the polymer is washed with methanol by means of a turbo-grinder and dried. The yield is 90%. The glass transition temperature of the amorphous polymer obtained, measured by means of the differential thermal analyzer, Du Pont 900, is 14° C. The infra-red spectrum shows that polymerization is effected by ring opening.

EXAMPLE 2

The operation is carried out as in Example 1, utilizing the n-propyl ester instead of the ethyl ester. The glass transition temperature of the polymer obtained as +7° C.

EXAMPLE 3

The operation is carried out as in Example 1 using the n-pentyl ester instead of the ethyl ester. The glass transition temperature of the polymer obtained is —18° C.

With a roller mixer, 100 parts by weight of the polymer are incorporated with 50 parts by weight of HAF black, (Cabot Vulcan 3), 4 parts by weight of zinc oxide, 2 parts by weight of sulphur, 1 part by weight of N-cyclohexyl-benzothiazyl-sulphenamide (Rodifax 16, Rhone Poulenc). The mixture obtained is vulcanized for 300 minutes at 165° C. in the form of plates. The mechanical properties under tension are determined by means of an Instron tensile machine, following the ASTM standard D–438: modulus at 100% elongation: 0.35 kg./sq. mm.; elongation to breaking: 450%; breaking strength: 2.17 kg./sq. mm.

EXAMPLE 4

The operation is carried out as in Example 1, using the n-pentyl ester instead of the ethyl ester. The glass transition temperature of the polymer obtained is —26° C.

EXAMPLE 5

The operation is as in Example 1, using the n-hexyl ester instead of the ethyl ester. The glass transition temperature of the polymer obtained is —19° C.

EXAMPLE 6

The operation is as in Example 1, using the n-heptyl ester instead of the ethyl ester. The glass transition temperature of the polymer obtained is —43° C.

EXAMPLE 7

The operation is as in Example 1, using the n-octyl ester instead of the ethyl ester. The glass transition temperature of the polymer obtained is —53° C.

EXAMPLE 8

The operation is the same as in Example 1, using the n-decyl ester instead of the ethyl ester. The glass transition temperature of the polymer obtained is —45° C.

EXAMPLE 9

The operation is the same as in Example 1, using the n-dodecyl ester instead of the ethyl ester. The glass transition temperature of the polymer obtained is —45° C.

EXAMPLE 10

The operation is the same as for Example 1, using the 2-methoxy-ethyl ester instead of the ethyl ester. The glass transition temperature of the polymer obtained is 0° C.

EXAMPLE 11

The operation is the same as for Example 1, using the 2-ethoxy-ethyl ester instead of the ethyl ester. The glass transition temperature of the polymer obtained is —10° C.

EXAMPLE 12

The operation is the same as for Example 1, using the 2-n-butoxy-ethyl ester instead of the ethyl ester. The glass transition temperature of the polymer obtained is —35° C.

EXAMPLE 13

The operaion is the same as in Example 1, using the ester derived from diethylene-glycol monoethyl ether instead of the ethyl ester. The glass transition temperature of the polymer obtained is —34° C.

EXAMPLE 14

The operation is the same as in Example 1, using the n-hexadecyl ester instead of the ethyl ester. The polymer obtained shows a melting point of +10° C. by differential thermal analysis.

EXAMPLE 15

The anhydride of endo-cis-bicyclo [2.2.1] heptene-2 dicarboxylic-5,6 acid obtained by dienic synthesis of maleic anhydride with cyclo-pentadiene is treated at 190° C. in boiling Decalin for 1½ hours. The exo-cis anhydride is extracted from the mixture obtained by fractional crystallization in benzene. Repeating the thermal treatment on the unconverted isomer, 90% of the product employed can be converted to exo-cis isomer. After esterification with n-butyl alcohol, an exo-cis diester is obtained.

In an ampoule there is introduced 0.05 mol. of di-n-butyl ester of exo-cis bicyclo [2.2.1] heptene-2 dicarboxylic-5,6 acid, with 10 ml. of toluene, 33 mg. of hydrated ruthenium chloride and 2.5 ml. of the alcohol which was used to prepare the ester. After having degasified under vacuum by successive melting and freezing of the reactants, this ampoule is sealed and placed in a heat-controlled bath at 90° C. for 24 hours. After polymerization, the ampoule is broken and the polymer is washed with methanol by means of a turbo-grinder, and dried.

According to the differential thermal analysis carried out on the Du Pont 900 apparatus, the polymer obtained is amorphous. The glass transition temperature of the polymer is —18° C. Its infra-red spectrum shows that polymerization is effected by ring opening.

In order to obtain a vulcanizable master-mixture, the following constituents are incorporated with 100 parts by weight of the polymer obtained:

| | Parts |
|---|---|
| Diluent to facilitate mixing (Dutrex V2 oil) | 10 |
| Vulcan black 9 SAF | 50 |
| Zinc oxide | 5 |
| Stearic acid | 2 |
| Zinc salt of mercapto-benzimidazole | 1 |
| Sulphur | 4 |
| Rodifax 16 | 2 |

This mixture is vulcanized at 170° C. for 48 minutes. After vulcanization, the master-mixture has the following properties:

Breaking force—1.81 kg./sq. mm.
Modulus at 100% elongation—0.85 kg./sq. mm.
Elongation at breaking—317%.

EXAMPLE 16

The operation is carried out as in Example 15, utilizing the di-n-pentyl ester instead of the di-n-butyl ester. The glass transition temperature of the polymer obtained is —35° C.

EXAMPLE 17

The operation is the same as for Example 15, using the di-n-hexyl ester instead of the di-n-butyl ester. The glass transition temperature of the polymer obtained is —65° C.

EXAMPLE 18

The operation is effected as in Example 15, using the di-n-heptyl ester instead of the di-n-butyl ester. The glass transition temperature of the polymer obtained is —85° C.

(a) Following the method described in Example 3, to 100 parts by weight of this polymer, there are incorporated: 40 parts by weight of Vulcan black 3; 10 parts by weight of a predominantly aromatic oil (Dutrex V2—Shell) to facilitate the mixing; 5 parts by weight of zinc oxide; 2 parts by weight of sulphur; 1 part by weight of Rodifax 16; 2 parts by weight of stearic acid; 1 part by weight of zinc mercaptobenzimidazolate (Permanax Z 21 Rhone-Poulenc. The mixture is vulcanized for 30 minutes at 165° C. The properties determined as in Example 3 are as follows: modulus at 100% elongation: 0.35 kg./sq. mm.; elongation to breaking: 310%; breaking force 1.25 kg./sq. mm.

(b) A mixture containing 60 parts by weight of Vulcan 3 black instead of 40 parts by weight is prepared and vulcanized as previously. Its properties are as follows: modulus at 100% elongation: 1.6 kg./sq. mm.; elongation to breaking: 150%; breaking force: 1.8 kg./sq. mm.

EXAMPLE 19

The operation is the same as for Example 15, utilizing the di-n-octyl ester instead of the di-n-butyl ester. The glass transition temperature of the polymer obtained is —83° C.

EXAMPLE 20

The operation is the same as for Example 15, utilizing the di-n-nonyl ester instead of the di-n-butyl ester. The glass transition temperature of the polymer obtained is —88° C.

EXAMPLE 21

The operation is effected as for Example 15, utilizing the di-n-decyl ester instead of the di-n-butyl ester. The glass transition temperature of the polymer obtained is —70° C.

EXAMPLE 22

The operation is effected as for Example 15, utilizing the di-2-methoxy-ethyl ester instead of the di-n-butyl ester. The glass transition temperature of the polymer obtained is —10° C.

EXAMPLE 23

The same operation is followed as in Example 15, using the di-2-ethoxy-ethyl ester instead of the di-n-butyl ester. The glass transition temperature of the polymer obtained is —30° C.

To 100 parts by weight of this polymer there are incorporated the same ingredients as in Example 18(a), following the method described in Example 3. This mixture is vulcanized for 60 minutes at 160° C. The properties obtained are as follows: Modulus at 100% elongation: 0.36 kg./sq. mm.; elongation at breaking: 520%, breaking force: 1.78 kg./sq. mm.

EXAMPLE 24

The operation is the same as for Example 15, utilizing the di-2-n-butoxy ethyl ester instead of the di-n-butyl ester. The glass transition temperature of the polymer obtained is —75° C.

(a) To 100 parts by weight of this polymer, there are incorporated: 50 parts by weight of Vulcan 3 black; 10 parts by weight of Dutrex V2 oil; 5 parts by weight of zinc oxide; 1 part by weight of stearic acid; 2 parts by weight of sulphur; 1 part by weight of Rodifax 16; 0.5 part by weight of Permanax Z 21. The mixture is vulcanized for 60 minutes at 165° C. The properties obtained are as follows: Modulus at 100% elongation: 1.16 kg./sq. mm.; elongation at breaking: 210%; breaking force: 1.80 kg./sq. mm.

(b) In the previous mixture (a), the Vulcan 3 black is replaced by precipitated silica, and the Duplex V2 oil by tricresyl phosphate. The mechanical properties obtained are as follows: Modulus at 100% elongation: 1.13 kg./sq. mm.; elongation at breaking: 130%; breaking force: 1.30 kg./sq. mm.

EXAMPLE 25

The operation is the same as for Example 15, utilizing the di-2-n-hexyloxy-ethyl ester instead of the di-n-butyl ester. The glass transition temperature of the polymer obtained is —75° C.

EXAMPLE 26

The operation is the same as for Example 15, using the di(diethylene-glycol-mono-methyl-ether) ester instead of the di-n-butyl ester. The glass transition temperature of the polymer obtained is —68° C.

EXAMPLE 27

The operation is the same as for Example 15, utilizing the di(diethylene-glycol mono-ethyl-ether) ester instead of the di-n-butyl ester. The glass transition temperature of the polymer obtained is —62° C.

EXAMPLE 28

The operation is the same as for Example 15, using the di(diethylene-glycol n-monobutyl-ether) ester instead of the di-n-butyl ester. The glass transition temperature of the polymer obtained is —60° C.

EXAMPLE 29

The operation is the same as for Example 15, using the di(triethylene glycol monomethyl-ether) ester instead of the di-n-butyl ester. The glass transition temperature of the polymer obtained is —47° C.

EXAMPLE 30

The operation is the same as for Example 15, utilizing the di-(triethylene glycol mono-ethyl-ether) ester instead of the di-n-butyl ester. The glass transition temperature of the polymer obtained is —61° C.

EXAMPLE 31

The operation is the same as for Example 15, utilizing the di(triethylene glycol n-monobutyl-ether) ester instead of the di-n-butyl ester. The glass transition temperature of the polymer obtained is —76°.

EXAMPLE 32

The operation is the same as for Example 15, using the di-isobutyl ester instead of the di-n-butyl ester. The glass transition temperature of the polymer obtained is +20° C.

EXAMPLE 33

The operation is effected as in Example 15, using the di-iso-amyl ester instead of the di-n-butyl ester. The glass transition temperature of the polymer obtained is —20° C.

EXAMPLE 34

The operation is the same as for Example 15, using the di-2-ethyl-n-hexyl ester instead of the di-n-butyl ester. The glass transition temperature of the polymer obtained is —75° C.

EXAMPLE 35

The operation is effected as in Example 15, using the di-n-dodecyl ester instead of the di-n-butyl ester. The polymer shows a melting point of 0° C. by differential thermal analysis.

EXAMPLE 36

The operation is carried out as in Example 15, utilizing the di-n-hexadecyl ester instead of the di-n-butyl ester. By differential thermal analysis, the polymer shows a melting point of 32° C.

EXAMPLE 37

The operation is the same as for Example 15, using the di-n-octadecyl ester instead of the di-n-butyl ester. The polymer shows by differential thermal analysis a melting point of +35° C.

EXAMPLE 38

The operation is the same as in Example 15, using the di-n-eicosyl ester instead of the di-n-butyl ester. By differential thermal analysis, the polymer shows a melting point of +50° C.

EXAMPLE 39

The operation is the same as in Example 15, using the di-n-docosyl ester instead of the di-n-butyl ester. The polymer shows by differential thermal analysis a melting point of +60° C.

EXAMPLE 40

The operation is carried out as in Example 1, with 8 grams of n-dodecyl ester of bicyclo [2.2.1] heptene-2 carboxylic-5 acid, 33.5 grams di-(triethylene glycol mono-methyl-ether) ester of exo-cis bicyclo [2.2.1] heptene-2 dicarboxylic-5.6 acid, 5 mg. of ruthenium chloride and 1 ml. of mono-methyl-ether of triethylene glycol. There are obtained 14 grams of copolymer having a glass transition temperature of —50° C.

EXAMPLE 41

The operation is carried out as in Example 40, with 32 grams of the same monoester and 47 grams of the same diester. There are obtained 13 grams of copolymer, the glass transition temperature of which is —50° C.

EXAMPLE 42

The operation is the same as for Example 40, with 24 grams of the same monoester and 11 grams of the same diester. There are obtained 11 grams of copolymer the glass transition temperature of which is —50° C.

EXAMPLE 43

50 mol percent of di-n-butyl ester of exo-cis bicyclo [2.2.1] heptene-2 dicarboxylic-5,6 acid is mixed with 50 mol percent of di-(triethylene glycol mono n-butyl ether) ester of exo-cis bicyclo [2.2.1] heptene-2 dicarboxylic-5.6 acid. The operation is carried out as in Example 40 using as the alcohol component the n-monobutyl ether of triethylene glycol. There is obtained, in a yield of 46% a copolymer containing 23 mol percent of the di-n-butyl ester. The glass transition temperature of this copolymer is —56° C.

EXAMPLE 44

The operation is carried out as in Example 43, with a monomer mixture containing 60 mol percent of di-n-butyl diester. There is obtained, in a yield of 44%, a copolymer containing 33 mol percent of the di- n-butyl ester. The glass transition temperature of this copolymer is —51° C.

EXAMPLE 45

The operation is the same as for Example 43, with a monomer mixture containing 70 mol percent of di-n-butyl ester. There is obtained, in a yield of 44%, a copolymer containing 49 mol percent of the di-n-butyl ester. The glass transition temperature of this copolymer is —49° C.

EXAMPLE 46

The operation is carried out as for Example 43, with a monomer mixture containing 80 mol percent of di-n-butyl ester. There is obtained, in a yield of 44%, a copolymer containing 70 mol percent of the di-n-butyl ester. The glass transition temperature of this copolymer is —36° C.

EXAMPLE 47

The operation is the same as for Example 43, with a monomer mixture containing 90 mol percent of di-n-butyl ester. There is obtained, in a yield of 45%, a copolymer containing 84 mol percent of the di-n-butyl ester. The glass transition temperature of this copolymer is —28° C.

EXAMPLE 48

The operation is the same as for Example 1, with 50 grams of di-n-heptyl ester of bicyclo [2.2.1] heptene-2 dicarboxylic-5.6 acid, 50 grams of bicyclo [2.2.1] heptene-2, 40 ml. of toluene, 66 mg. of hydrated ruthenium chloride and 20 ml. of n-heptyl alcohol. There are obtained 87 grams of copolymer containing 88 mol percent of bicyclo [2.2.1] heptene-2. The glass transition temperature of this copolymer is —16° C.

100 parts by weight of this copolymer are incorporated by the method described in Example 3, to 30 parts by weight of Vulcan 3 black, 10 parts by weight of Dutrex V2 oil, 5 parts by weight of zinc oxide, 1 part by weight of stearic acid, 1 part by weight of sulphur, 1 part by weight of Rodifax 16, 0.5 part of weight of Permanax Z 21. The mixture is vulcanized at 170° C. for 30 minutes. The properties obtained are as follows: Modulus at 100% elongation: 0.34 kg./sq. mm.; breaking force: 2.8 kg./sq. mm.; breaking elongation: 450%.

EXAMPLE 49

The operation is the same as for Example 48, with 75 grams of the diester and 25 grams of bicyclo [2.2.1] heptene-2. There are obtained 75 grams of copolymer containing 60 mol percent of bicyclo [2.2.1] heptene-2. The glass transition temperature of this copolymer is —43° C.

To 100 parts by weight of this copolymer are incorporated the same quantities of vulcanization ingredients as in Example 48. The vulcanization is carried out under the same conditions. The properties obtained are as follows: Modulus at 100% elongation: 0.27 kg./sq. mm.; breaking elongation: 420%; breaking force: 2.50 kg./sq. mm.

EXAMPLE 50

The operation is the same as for Example 48, with 90 grams of the diester and 10 grams of bicyclo [2.2.1] heptene-2. There are obtained 70 grams of copolymer containing 45 mol percent of bicyclo [2.2.1] heptene-2. The glass transition temperature of this copolymer is —55° C.

EXAMPLE 51

The operation is the same as for Example 48, with 1.14 grams of n-heptyl ester and 1.29 grams of methyl-5 bicyclo [2.2.1] heptene-2, 5.6 ml. of toluene, 2.6 mg. of hydrated ruthenium chloride and 1 ml. of n-heptyl alcohol. There are obtained 1.40 grams of copolymer containing 78 mol percent of methyl-5 bicyclo [2.2.1] heptene-2. The glass transition temperature of this copolymer is +11° C.

EXAMPLE 52

The operation is the same as for Example 51, with 1.70 grams of the diester and 0.73 gram of methyl-5 bicyclo [2.2.1] heptene-2. There are obtained 1.21 grams of copolymer containing 56 mol percent of methyl-5 bicyclo [2.2.1] heptene-2. The glass transition temperature of this copolymer is −28° C.

EXAMPLE 53

The operation is the same as for Example 51, with 2.04 grams of the diester and 0.39 gram of methyl-5 bicyclo [2.2.1] heptene-2. There are obtained 0.80 gram of copolymer containing 28 mol percent of methyl-5 bicyclo [2.2.1] heptene-2. The glass transition temperature of this copolymer is −35° C.

EXAMPLE 54

The operation is the same as for Example 51, with 2.28 grams of the diester and 0.16 gram of methyl-5 bicyclo [2.2.1] heptene-2. There is obtained 0.14 gram of copolymer containing 16 mol percent of methyl-5 bicyclo [2.2.1] heptene-2. The glass transition temperature of this copolymer is −84° C.

EXAMPLE 55

The operation is the same as that followed in Example 1, with 2.7 grams of methyl-5 bicyclo [2.2.1] heptene-2 and 14.5 grams of n-butyl ester of bicyclo [2.2.1] heptene-2 carboxylic-5 acid.

There are obtained 4.5 grams of copolymer, in a yield of 26%, containing 60 mol percent of methyl-5 bicyclo [2.2.1] heptene-2 following elementary analysis and having a glass transition temperature of −5° C.

EXAMPLE 56

The operation is carried out in the same way as for Example 1, with 14.5 grams of n-butyl ester of bicyclo [2.2.1] heptene-2 carboxylic-5 acid and 2.3 grams of bicyclo [2.2.1] heptene-2.

There are obtained 5 grams of copolymer in a yield of 20%, containing 65 mol percent of bicyclo [2.2.1] heptene-2 following elementary analysis and having a glass transition temperature of 0° C.

The properties of the master-mixture vulcanized following the method of Example 3 are as follows:

Glass transition temperature $Tg=-30°$ C., breaking strength=2.9 kg./sq. mm.; modulus at 100% elongation=0.40 kg./sq. mm.; breaking elongation=380%.

In all the examples which follow:

The glass transition temperatures are measured by means of a du Pont 900 differential thermal analysis apparatus. The rate of heating is 50° C. per minute.

The mechanical properties under tension, namely: breaking force, modulus at 100% elongation, modulus at 200% elongation, elongation to breaking, are measured in accordance with the ASTM standard D 412.

The Shore A hardness is measured following the ASTM standard D 676.

The rebound resilience is measured according to the D. I. N. standard 55–412.

The compression remanence is measured following the ASTM standard D 3.95, method B.

The swelling in oils is measured following the ASTM standard D 471 with ASTM oils Nos. 1, 2, 3.

The quantities are given in parts by weight for 100 parts of resin.

EXAMPLE 57

Trans bicyclo [2.2.1] heptene-2 dicarboxylic-5,6 acid obtained by dienic synthesis of fumaric acid with cyclopentadiene is esterified with n-butyl alcohol. The trans diester is obtained.

In a flask there are introduced 29.4 grams of di-butyl diester of trans bicyclo [2.2.1] heptene-2 dicarboxylic-5,6, 3 mg. of trihydrate ruthenium chloride, 100 mg. of "2246" anti-oxidizing agent (di[hydroxy-2 tertiary-butyl-3 methyl-5-phenyl]methane) and 1 ml. of butyl alcohol. This flask, after having been degasified by successive freezing and melting of the reactants is sealed and placed in a bath held at 90° C. for 3 hours.

At the end of the polymerization, the flask is broken and the polymer is ground with a turbo-grinder and washed with methanol. After drying under vacuum, there are obtained 12.8 grams of polymer (yield 43.5%).

Infra-red spectrography shows that this is a polymer obtained by ring opening. The polymer has a glass transition temperature $Tg=-26°$ C. The average molecular weight (measured by light scattering on a Sofica apparatus) is $2.3 \times 10^6$, working in a solution in tetra-hydrofuran.

By means of an internal mixer of the Brabender type, there are incorporated at 110° C., 10 parts of Dutrex V2 Shell oil for 100 parts of resin in order to dilute the medium, the mixing time being 30 minutes.

This mixture is passed into a two rollers mixer type AMIL at a temperature of 70° C. To this mixture there are incorporated successively at the times indicated:

|  | Min. |
|---|---|
| 50 parts SAF black (Vulcan 9 Cabot) | −3 |
| 5 parts zinc oxide | −9 |
| 2 parts stearic acid | −11 |
| 1 part zinc salt of mercapto-benzimidazole (accelerator Permanax Z 21 Rhone-Poulenc) | +12 |
| 2 parts sulphur | −13 |
| 1 part N-cyclohexyl-2 benzothiazyl-sulphenamide (Rodifax 16 Rhone-Poulenc) | −15 | and the ingredients are mixed together for 1 minute.

The master-mixture is moulded and vulcanized at a temperature of 155° C. for 30 minutes; the pressure of closure on the mould is 35.7 kgf./sg. cm. The samples are then left to rest for 12 hours before beginning the test.

The properties of the vulcanized mixture are as follows: glass transition temperature $Tg=-37°$ C.; breaking force: 1.39 kg./sq. mm.; modulus at 100% elongation: 0.063 kg./sq. mm.; modulus at 200% elongation: 0.064 kg./sq. mm.; breaking elongation: 743%; Shore A hardness: 41.5; resilience: 8%; compression remanence: 29.2%: swelling in oil ASTM No. 1: 0.4%; swelling in oil ASTM No. 2: 0.6% swelling in ASTM oil No. 3: 8.7%.

EXAMPLE 58

The operation is carried out in the same way as in Example 57, at a temperature of 90° C. for 3 hours with 29.4 grams of di-n-butyl diester of trans bicyclo [2.2.1] heptene-2-dicarboxylic-5,6 acid, 3 mg. of trihydrate ruthenium chloride, 100 mg. of 2246 anti-oxidizing agent and 1 ml. of butyl alcohol.

There are obtained 3.4 grams of polymer (yield 11.5%) having a glass transition temperature $Tg=-21°$ C.

The properties of the mixture vulcanized following the method of Example 57, are as follows:

Glass transition temperature $Tg=-33°$ C.; breaking strength: 1.22 kg./sq. mm., modulus at 100% elongation: 0.079 kg./sq. mm.; modulus at 200% elongation: 0.078 kg./sq. mm.; breaking elongation: 685%; Shore A hardness: 42; resilience: 8.5%; compression remanence: 336%; swelling in ASTM oil No. 1: −0.2%; in ASTM oil No. 2: 0.9%; in ASTM oil No. 3: 9.1%.

EXAMPLE 59

The operation is the same as in the method of Example 57, at a temperature of 90° C. for 20 hours with 71 grams of di-ethyl ester of trans bicyclo [2.2.1] heptene-2-dicarboxylic-5,6 acid and 180 mg. of trihydrate ruthenium chloride, 350 mg. of of antioxidizing agent and 12 ml. of ethyl alcohol.

There are obtained 34 grams of polymer (yield 48%) having a glass transition temperature $Tg=-35°$ C.

EXAMPLE 60

The operation is carried out following the method of Example 57, at a temperature of 90° C. for 20 hours with 66.5 grams of di-n-propyl ester of trans bicyclo [2.2.1] heptene-2-dicarboxylic-5,6 acid, 150 mg. of trihydrate ruthenium chloride, 330 mg. of anti-oxidizing agent and 10 ml. of n-propyl alcohol.

There are obtained 45.5 grams of polymer (yield 68.5%) having a glass transition temperature $Tg=0°$ C.

EXAMPLE 61

The operation is the same as for Example 57, at a temperature of 90° C. for 3 hours, with 37.8 grams of di-n-heptyl ester of trans bicyclo [2.2.1] heptene-2-dicarboxylic-5,6 acid, 3 mg. of trihydrate ruthenium chloride, 100 mg. of antioxidizing agent 2246 and 1 ml. of n-heptyl alcohol.

There are obtained 3.5 grams of polymer (yield 9.2%) having a glass transition temperature $Tg=-85°$ C. Average molecular by weight $M=1.27 \times 10^6$.

EXAMPLE 62

The operation is the same as for Example 57, at a temperature of 90° C. for 3 hours with 4.7 grams of bicyclo [2.2.1] heptene-2 and 29.4 grams of di-n-butyl diester of trans bicyclo [2.2.1] heptene-2 dicarboxylic 5,6 acid, 4.5 mg. of trihydrate ruthenium chloride, 100 mg. of antioxidizing agent 2246 and 1 ml. of n-butyl alcohol.

There are obtained 12.7 grams of copolymer (yield 37%) containing 58 mol percent of bicyclo [2.2.1] heptene-2 following elementary analysis, and having a glass transition temperature $Tg=-52°$ C.

The properties of the mixture vulcanized following the technique of Example 57 are as follows:

Glass transition temperature $Tg=-32°$ C.; breaking force: 3.13 kg./sq. mm.; modulus at 100% elongation: 0.41 kg./sq. mm.; modulus at 200% elongation: 0.66 kg./sq. mm.; breaking elongation: 342%; Shore A hardness: 71; resilience: 9.5%; compression remanence: 17.7%; swelling in ASTM oil No. 1: 0.10%; in ASTM oil No. 2: 1.30%; in ASTM oil No. 3: 8.60%.

EXAMPLE 63

The operation is the same as for Example 57, at a temperature of 90° C. for 3 hours with 18.8 grams of bicyclo [2.2.1] heptene-2 and 29.4 grams of di-n-butyl ester of trans bicyclo [2.2.1] heptene-2 dicarboxylic-5,6 acid, 9 mg. of trihydrate ruthenium chloride, 200 mg. of antioxidizing agent 2246 and 2 ml. of butyl alcohol.

There are obtained 20.2 grams of copolymer (yield 42%) containing 88 mol percent of bicyclo [2.2.1] heptene-2 following elementary analysis and having a glass transistion temperature $Tg=-32°$ C.

The properties of the mixture vulcanized by the method of Example 57 are as follows:

Glass transition temperature $Tg=-17°$ C.; breaking force: 3.43 kg./sq. mm.; modulus at 100% elongation: 0.90 kg./sq. mm.; modulus at 200% elongation: 1.22 kg./sq. mm.; breaking elongation; 276%; Shore A hardness: 80; resilience: 5.4%; compression remanence: 25.4%; swelling in ASTM oil No. 1: 0.3%; in ASTM oil No. 2: 0.7%; in ASTM oil No. 3: 5.3%.

EXAMPLE 64

The operation is the same as in Example 57, at a temperature of 90° C. for 3 hours with 5.4 grams of methyl-5 bicyclo [2.2.1] heptene-2 and 29.4 grams of di-n-butyl ester of trans bicyclo [2.2.1] heptene-2 dicarboxylic-5,6 acid, 4.5 mg. of trihydrate ruthenium chloride, 100 mg. of antioxidizing agent 2246 and 1 ml. of n-butyl alcohol.

There are obtained 14 grams of copolymer (yield 40%) containing 61 mol percent of methyl-5 bicyclo [2.2.1] heptene-2 following elementary analysis and having a glass transition temperature $Tg=-40°$ C.

The properties of the mixture vulcanized following the method of Example 57 are as follows:

Glass transition temperature $Tg=-35°$ C.; breaking force: 2.9 kg./sq. mm.: modulus at 100% elongation: 0.27 kg./sq. mm.; modulus at 200% elongation: 0.48 kg./sq. mm.; breaking elongation: 450%; Shore A hardness: 80; resilience: 25%; compression remanence: 35%; swelling in ASTM oil No. 1: 0.1%; swelling in ASTM oil No. 2: 1.2%; in ASTM oil No. 3: 8.4%.

EXAMPLE 65

The operation is carried out as in Example 57, at a temperature of 90° C. for 3 hours with 4.7 grams of bicyclo [2.2.1] heptene-2 and 37.8 grams of di-n-heptyl ester of trans bicyclo [2.2.1] heptene-2 dicarboxylic-5,6 acid, 4.5 mg. of trihydrate ruthenium chloride, 100 mg. of antioxidizing agent 2246 and 1 ml. of n-heptyl alcohol.

There are obtained 8.9 grams of copolymer (yield 21%) containing 60 mole percent of bicyclo [2.2.1] heptene-2 following elementary analysis and having a glass transition temperature $Tg=-69°$ C.

The properties of the mixture vulcanized following the method of Example 57 are as follows:

Glass transition temperature $Tg=-69°$ C.; breaking force: 2.32 kg./sq. mm.; modulus at 100% elongation: 0.12 kg./sq. mm.; Modulus at 200% elongation: 0.14 kg./sq. mm.; breaking elongation: 563%; Shore A hardness: 46; resilience: 37%; compression remanence: 25%; swelling in ASTM oil No. 1: −3.4%; in ASTM oil No. 2 −0.1%; in ASTM oil No. 3: 19%.

EXAMPLE 66

The operation is carried out as in Example 57, at a temperature of 90° C. for 3 hours, with 9.4 grams of bicyclo [2.2.1] heptene-2 and 37.8 grams of di-n-heptyl ester of trans bicyclo [2.2.1] heptene-2 dicarboxylic-5,6 acid, 6 mg. of trihydrate ruthenium chloride, 150 mg. of antioxidizing agent 2246 and 1.5 ml. of n-heptyl alcohol.

There are obtained 19.8 grams of copolymer (yield 42%) containing 72 mol percent of bicyclo [2.2.1] heptene-2 following elementary analysis and having a glass transition temperature $Tg=-66°$ C.

The properties of the mixture vulcanized following the method of Example 57, are as follows:

Glass transition temperature $Tg=-54°$ C.; breaking force: 2.44 kg./sq. mm.; modulus at 100% elongation: 0.13 kg./sq. mm.; modulus at 200% elongation: 0.16 kg./sq. mm.; breaking elongation: 519%; Shore A hardness: 51.5; resilience: 35.5%; compression remanence: 24.5%; swelling in ASTM oil No. 1: −3%; in ASTM oil No. 2: −0.5%; in ASTM oil No. 3: 14.8%.

EXAMPLE 67

The operation is carried out following the technique of Example 57, at a temperature of 90° C. for 3 hours, with 18.8 grams of bicyclo [2.2.1] heptene-2 and 37.8 grams of di-n-heptyl ester of trans bicyclo [2.2.1] heptene-2 dicarboxylic-5,6 acid, 9 mg. of trihydrate ruthenium chloride, 200 mg. of antioxidizing agent 2246 and 2 ml. of n-heptyl alcohol.

There are obtained 25 grams of copolyemr (yield 41%) containing 77 mol percent of bicyclo [2.2.1] heptene-2 following elementary analysis and having a glass transition temperature $Tg=-64°$ C.

The properties of the mixture vulcanized by the method of Example 57 are as follows:

Glass transition temperature Tg=—61° C.; breaking force: 2.12 kg./sq. mm.; modulus at 100% elongation: 1.14 kg./sq. mm.; modulus at 200% elongation: 1.25 kg./sq. mm.; breaking elongation: 569%; Shore A hardness: 51; resilience: 37%; compression remanence: 27.3%; swelling in ASTM oil No. 1: —3.5%; in ASTM oil No. 2: —1.5%; in ASTM oil No. 3: 12.7%.

EXAMPLE 68

The operation is carried out as in Example 57, at a temperature of 90° C. for 3 hours, with 10.8 grams of methyl-5 bicyclo [2.2.1] heptene-2 and 37.8 grams of di-n-heptyl ester of trans bicyclo [2.2.1] heptene-2 carboxylic-5,6 acid, 6 mg. of trihydrate ruthenium chloride, 150 mg. of antioxidizing agent 2246 and 1.5 ml. of n-heptyl alcohol.

There are obtained 21 grams of copolymer (yield 43%) containing 75 mol percent of methyl-5 bicyclo [2.2.1] heptene-2 following elementary analysis, and having a glass transition temperature Tg=—64° C.

The properties of the mixture vulcanized according to the method of Example 57 as follows:

Glass transition temperature Tg=—58° C.; breaking force: 2.1 kg./sq. mm.; modulus at 100% elongation: 0.12 kg./sq. mm.; modulus at 200% elongation: 0.17 kg./sq. mm.; breaking elongation: 650%; Shore A hardness: 48; resilience: 38%; compression remanence: 42%; swelling in ASTM oil No. 1: —3.5%; in ASTM oil No. 2: —0.5%; in ASTM oil No. 3: 13.8%.

In the same manner as in Examples 57–58, starting with appropriate monomer mixtures, it is possible to obtain elastomers constituted by monoester trans-diester copolymers, copolymers of two trans-diesters and copolymers of exo-cis and trans-diesters.

It will of course be understood that the present invention has been described purely by way of explanation but not in any limitative sense and that any useful modification may be made thereto without thereby departing from its scope.

We claim:
1. Polymer applicable to the field of elastomers, comprising at least one fundamental unit having the formula:

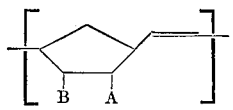

in which A is an ester group —COOR', and B is selected from the group consisting of H and —COOR", in which R' and R" are selected from the group comprising alkyl and oxi-alkyl radicals comprising preferably from 2 to 14 atoms of carbon in the main chain, said main chain being selected from the group comprising the straight chains and branched chains, excluding chains having a branch in alpha with respect to the carboxyl carbon.

2. Polymer useful as base for elastomers, of monoester comprising the fundamental unit having the formula:

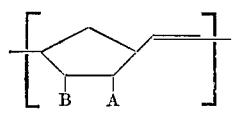

in which A is a COOR' group and B is hydrogen, and in which R' is selected from the group comprising alkyl and oxi-alkyl radicals preferably comprising 2 to 14 atoms of carbon in the main chain, said main chain being selected from the group comprising straight chains and branched chains, to the exclusion of chains branched in alpha with respect to the carboxyl carbon.

3. Polyymer useful as base for elastomers, of diester, comprising the fundamental unit having the formula:

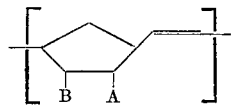

in which A is the COOR' group and B is a COOR" group, in which R' and R" are selected from the group comprising alkyl and oxi-alkyl radicals preferably comprising 2 to 14 atoms of carbon in the main chain, said main chain being selected from the group comprising the straight chains and branched chains, to the exclusion of chains having a branch in alpha with respect to the carboxyl carbon.

4. Homopolymer of diester as claimed in claim 3, in which R' is identical with R".

5. Homopolymer of diester as claimed in claim 3, in which R' is different from R".

6. Copolymer useful as base of elastomers, of monoester and diester, comprising the fundamental units having the formula:

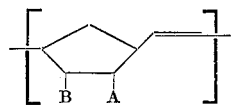

in which, as regards mono-ester, A is a COOR' group and B is hydrogen and, as regards the diester, A is a COOR' group and B is a COOR" group, R' and R" being selected from the group comprising alkyl and oxi-alkyl radicals preferably comprising from 2 to 14 atoms of carbon in the main chain, said main chain being selected from the group comprising straight chains and branched chains, to the exclusion of chains having a branch in alpha with respect to the carboxyl carbon.

7. Copolymer as claimed in claim 6, in which R' is identical with R".

8. Copolymer as claimed in claim 6, in which R' is different from R".

9. Copolymer useful as base for elastomers, of monoester and of bicyclo [2.2.1] heptene-2 comprising the fundamental unit having the formula:

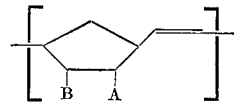

in which B is hydrogen and A is a COOR' group, in which R' is selected from the group comprising alkyl and oxi-alkyl radicals comprising from 2 to 14 atoms of carbon in the main chain, said main chain being selected from the group comprising the straight chains and branched chains, to the exclusion of the chains having a branch in alpha with respect to the carboxyl carbon.

10. Copolymer useful as base for elastomers, of monoester and methyl-5 bicyclo [2.2.1] heptene-2 comprising the unit having the formula:

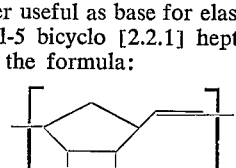

in which B is hydrogen and A is a COOR' group, in which R' is selected from the group comprising alkyl and oxi-alkyl radicals comprising from 2 to 14 atoms of carbon in the main chain, said main chain being selected from the group comprising the straight chains and branched chains, to the exclusion of the chains having a branch in alpha with respect to the carboxyl carbon.

11. Copolymer useful as base for elastomers, of diester and bicyclo [2.2.1] heptene-2 comprising the fundamental unit having the formula:

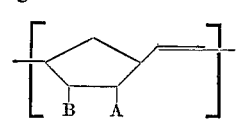

in which A and B are respectively COOR' and COOR" groups, R' and R" being selected from the group comprising alkyl and oxi-alkyl radicals preferably comprising from 2 to 14 atoms of carbon in the main chain, said chain being selected from the group comprising straight chains and branched chains, to the exclusion of chains having a branch in alpha with respect to the carboxyl carbon.

12. Copolymer as claimed in claim 11, in which R' is identical with R".

13. Copolymer as claimed in claim 11, in which R' is different from R".

14. Copolymer useful as base for elastomers, of diester and methyl-5 bicyclo [2.2.1] heptene-2, comprising the fundamental unit having the formula:

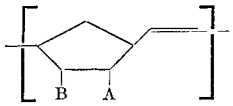

in which A and B are respectively COOR' and COOR" groups, R' and R" being selected from the group comprising alkyl and oxi-alkyl radicals preferably comprising from 2 to 14 atoms of carbon in the main chain, said main chain being selected from the group comprising straight chains and branched chains, to the exclusion of chains having a branch in alpha with respect to the carboxyl carbon.

15. Copolymer as claimed in claim 14, in which R' is identical with R".

16. Copolymer as claimed in claim 14, in which R' is different from R".

References Cited

UNITED STATES PATENTS 3,330,815   7/1967   McKeon et al.   260—93.1
3,367,924   2/1968   Rinehart   260—89.3

JOSEPH L. SCHOFER, Primary Examiner

J. KIGHT III, Assistant Examiner

U.S. Cl. X.R.

260—86.1, 89.3, 89.5